United States Patent
Gareau et al.

(10) Patent No.: US 9,432,144 B2
(45) Date of Patent: Aug. 30, 2016

(54) PRECISION TIME TRANSFER SYSTEMS AND METHODS IN OPTICAL NETWORKS

(71) Applicants: Sebastien Gareau, Ottawa (CA); Daniel Perras, Ottawa (CA)

(72) Inventors: Sebastien Gareau, Ottawa (CA); Daniel Perras, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 14/485,117

(22) Filed: Sep. 12, 2014

(65) Prior Publication Data

US 2016/0080110 A1    Mar. 17, 2016

(51) Int. Cl.
| | |
|---|---|
| H04L 1/00 | (2006.01) |
| H04B 10/27 | (2013.01) |
| H04J 3/16 | (2006.01) |
| H04J 3/06 | (2006.01) |
| H04B 10/60 | (2013.01) |

(52) U.S. Cl.
CPC ............. *H04L 1/0045* (2013.01); *H04B 10/27* (2013.01); *H04B 10/60* (2013.01); *H04J 3/0667* (2013.01); *H04J 3/1652* (2013.01)

(58) Field of Classification Search
CPC ........ H04L 1/0045; H04L 1/08; H04B 10/60
USPC ..................... 398/66, 43; 370/503
See application file for complete search history.

(56) References Cited

U.S. PATENT DOCUMENTS

| | | | |
|---|---|---|---|
| RE38,619 E * | 10/2004 | Paratore ................ | H04J 3/0655 370/347 |
| 6,816,510 B1 * | 11/2004 | Banerjee ................ | H04B 7/269 370/350 |
| 6,839,858 B1 | 1/2005 | James et al. | |
| 6,868,092 B1 | 3/2005 | Bell et al. | |
| 7,181,545 B2 | 2/2007 | Dziawa et al. | |
| 7,835,366 B2 | 11/2010 | Aweya et al. | |
| 8,370,704 B2 * | 2/2013 | Ganga ................... | H03M 5/145 714/757 |
| 8,594,018 B2 * | 11/2013 | Richards ............... | G01S 13/825 342/118 |
| 8,630,315 B2 | 1/2014 | Rivaud et al. | |
| 8,718,471 B2 | 5/2014 | Prakash et al. | |
| 8,737,389 B2 | 5/2014 | Chiesa et al. | |
| 2004/0006645 A1 | 1/2004 | Dziawa et al. | |

(Continued)

OTHER PUBLICATIONS

Roberts, et al., "Flexible Transceivers," ECOC Technical Digest, 2012 OSA, pp. 1-3.

(Continued)

*Primary Examiner* — Oommen Jacob

(74) *Attorney, Agent, or Firm* — Clements Bernard PLLC; Christopher L. Bernard; Lawrence A. Baratta, Jr.

(57) ABSTRACT

A precision time transfer method, in a first node that communicates with a second node, to determine a difference in time between the first node and the second node, the precision time transfer method includes receiving a departure time, $T_{D-A}$, from the second node, wherein the departure time is determined by the second node based on detecting a timing marker in a Forward Error Correction (FEC) frame or logical layer; determining an arrival time, $T_{A-B}$, based on detecting the timing marker in the FEC frame; and determining a time difference based on the departure time and the arrival time wherein the timing marker is detected at a last point in a transmitter of the second node and at a first point in a receiver of the first node, during FEC processing.

23 Claims, 4 Drawing Sheets

(56) References Cited

U.S. PATENT DOCUMENTS

| | | | |
|---|---|---|---|
| 2006/0007943 A1* | 1/2006 | Fellman | H04L 1/0045 370/400 |
| 2006/0109805 A1* | 5/2006 | Malamal Vadakital | H04L 29/06027 370/299 |
| 2008/0069248 A1* | 3/2008 | Heise | H04L 1/0071 375/254 |
| 2009/0297164 A1* | 12/2009 | Horiuchi | H04J 3/0682 398/154 |
| 2010/0042883 A1* | 2/2010 | Heise | H04L 1/1896 714/748 |
| 2010/0150243 A1* | 6/2010 | Kure | H03M 13/353 375/240.24 |
| 2011/0019681 A1 | 1/2011 | Gazier et al. | |
| 2011/0252265 A1* | 10/2011 | Iwami | H04N 19/645 713/401 |
| 2011/0255546 A1 | 10/2011 | Pallee et al. | |
| 2011/0274149 A1* | 11/2011 | Xu | H04J 3/0638 375/222 |
| 2012/0213508 A1* | 8/2012 | Moynihan | H04J 3/1658 398/25 |
| 2012/0224846 A1* | 9/2012 | Swanson | H04B 10/0705 398/13 |
| 2013/0045005 A1* | 2/2013 | Nakura | H04B 10/272 398/25 |
| 2013/0129345 A1 | 5/2013 | Meng et al. | |
| 2013/0136218 A1* | 5/2013 | Kure | H04N 21/44004 375/356 |
| 2013/0272143 A1* | 10/2013 | Schoppmeier | H04L 45/70 370/252 |
| 2013/0301634 A1 | 11/2013 | Ehlers et al. | |
| 2013/0308349 A1 | 11/2013 | Young et al. | |
| 2014/0079409 A1 | 3/2014 | Ruffini et al. | |
| 2014/0093235 A1 | 4/2014 | Gareau et al. | |
| 2014/0177653 A1 | 6/2014 | Tzeng | |
| 2014/0219651 A1* | 8/2014 | Ruffini | H04J 14/02 398/33 |
| 2014/0269778 A1* | 9/2014 | Yang | H04J 3/0697 370/503 |
| 2014/0348184 A1* | 11/2014 | Kure | H04N 21/242 370/503 |

OTHER PUBLICATIONS

Roberts, et al., "100G and Beyond with Digital Coherent Signal Processing," IEEE Communications Magazine, Jul. 2010, pp. 62-69.

Garner, "IEEE 1588 Version 2," ISPCS, Sep. 24, 2008, slides 1-89.

Gho, et al., "Rate-Adaptive Coding for Optical Fiber Transmission Systems," Journal of Lightwave Technology, vol. 29, No. 2, Jan. 15, 2011, pp. 222-233.

"Precision time protocol telecom profile for frequency synchronization," International Telecommunication, Jul. 2014, pp. 1-28.

* cited by examiner

PRECISION TIME TRANSFER SYSTEMS AND METHODS IN OPTICAL NETWORKS

FIELD OF THE DISCLOSURE

The present disclosure relates generally to networking systems and methods. More particularly, the present disclosure relates to precision time transfer systems and methods in optical networks such as with Optical Transport Network (OTN) or the like.

BACKGROUND OF THE DISCLOSURE

Timing synchronization between nodes in a network is described in various standards such as IEEE 1588-2008 "Standard for a Precision Clock Synchronization Protocol for Networked Measurement and Control Systems," ITU-T G.8265.1/Y.1365.1 (07/14) "Precision time protocol telecom profile for frequency synchronization," ITU-T G.8275.1 "Time and Phase Profile," the contents of each is incorporated by reference herein. The requisite information for the transfer of precise time is (1) a time reference point, or "significant instant" to which timing information can be related, (2) the timing information itself, and (3) a measure of the delay it takes to transfer the timing information between two nodes. The transfer of time over optical networks can be challenging because of the delays introduced by elastic First-In-First-Out (FIFOs) required in transport mapping schemes such as OTN and enhanced high coding gain soft decision Forward Error Correction (SD-FEC) schemes. Uncertainty in these delays (at start-up, or after fault recovery) results in uncertainty in the transferred time. Also, variability and uncertainty in these delays results in time error in between the network nodes.

IEEE 1588-2008 is referred to as Precision Time Protocol (PTP) and is used to synchronize clocks throughout the network. IEEE 1588-2008 only defines a protocol for transferring time information over a packet network. It does not address performance aspects such as the time accuracy that can be achieved over a network. In general, PTP supports accuracy in the sub-microsecond range. ITU-T defines performance aspects of Ethernet telecom networks, but to date, has not defined performance aspects for OTN networks. Based on current 100 GB/s system designs, measurements have shown that the optical transport equipment can contribute hundreds of nanoseconds of time uncertainty over a single network hop. Measurements of some off-the-shelf components have shown much worse performance. The ITU-T is currently developing standards to address the shortcomings of time transfer over OTN networks. However, these newly developed standards will not address the time uncertainty and jitter that can be introduced by SD-FEC type of schemes added on the line side in optical modem/Digital Signal Processing (DSP) devices, as these schemes and devices have non-deterministic timing therein.

BRIEF SUMMARY OF THE DISCLOSURE

In an exemplary embodiment, a precision time transfer method, in a first node that communicates with a second node, to determine a difference in time between the first node and the second node, includes receiving a departure time, $T_{D-A}$, from the second node, wherein the departure time, $T_{D-A}$, is determined by the second node based on detecting a timing marker in a Forward Error Correction (FEC) frame or layer; determining an arrival time, $T_{A-B}$, based on detecting the timing marker in the FEC frame or layer; and determining a time difference based on the departure time and the arrival time; wherein the timing marker is detected at a last point in a transmitter of the second node and at a first point in a receiver of the first node, during FEC processing. The receiving can be performed by a protocol layer separate from the FEC frame or layer. The precision time transfer method can further include transmitting a FEC frame to the second node and determining a departure time, $T_{D-B}$, responsive to detecting a timing marker in the FEC frame; and receiving an arrival time, $T_{A-A}$, from the second node, wherein the arrival time, $T_{A-A}$, is determined by the second node based on detecting the timing marker in the FEC frame. The precision time transfer method can further include determining a delay between the first node and the second node as:

$$\text{Round\_Trip\_Delay} = [(T_{A-B} - T_{D-A}) + (T_{A\_A} - T_{D-B})]$$

$$\text{Delay} = \frac{\text{Round\_Trip\_Delay}}{2}.$$

The FEC frame can utilize Soft Decision FEC. The last point can be in a FEC encoder engine in the transmitter and the first point can be in a FEC decoder engine in the receiver. The last point can be subsequent to FEC encoding and line adaptation and the first point can be prior to FEC decoding and line adaptation thereby eliminating timing uncertainty based thereon. The first node and the second node can communicate via Optical Transport Network. The time difference can be independent from an amount of time spent processing in the FEC layer. The timing marker can be present in the FEC frame or layer at a given interval. The timing marker, in the FEC frame or layer, can be one of a toggling signal, a fixed pattern, one or more overhead bits, a delimiter, and a line encoding signal.

In another exemplary embodiment, a node that communicates with a second node, and the node is configured to determine a difference in time from the second node, includes one or more line ports communicatively coupled to the second node; and a controller communicatively coupled to the one or more line ports, wherein the controller is configured to receive a departure time, $T_{D-A}$, from the second node, wherein the departure time, $T_{D-A}$, is determined by the second node based on detecting a timing marker in a Forward Error Correction (FEC) frame, determine an arrival time, $T_{A-B}$, based on detecting the timing marker in the FEC frame, and determine a time difference based on the departure time and the arrival time, wherein the timing marker is detected at a last point in a transmitter of the second node and at a first point in a receiver of a line port, during FEC processing. The controller can be communicatively coupled to the second node via a protocol layer separate from the FEC frame, to receive the departure time, $T_{D-A}$. The controller can be further configured to determine a departure time, $T_{D-B}$, responsive to detecting the timing marker in a FEC frame transmitted to the second node; and receive an arrival time, $T_{A-A}$, from the second node, wherein the arrival time, $T_{A-A}$, is determined by the second node based on detecting the timing marker in the FEC frame. The controller can be further configured to determine a delay to the second node as:

$$\text{Round\_Trip\_Delay} = [(T_{A-B} - T_{D-A}) + (T_{A\_A} - T_{D-B})]$$

-continued $$Delay = \frac{Round\_Trip\_Delay}{2}.$$

The last point can be in a FEC encoder engine in the transmitter and the first point can be in a FEC decoder engine in the receiver. The last point can be subsequent to FEC encoding and line adaptation and the first point can be prior to FEC decoding and line adaptation thereby eliminating timing uncertainty based thereon. The timing marker can be present in the FEC frame or logical layer at a given interval. The timing marker, in the FEC frame, can be one of a toggling signal, a fixed pattern, one or more overhead bits, a delimiter, and a line encoding signal.

In a further exemplary embodiment, an optical modem, configured to determine precise time information regardless of timing uncertainties due to Forward Error Correction (FEC) processing and adaptation therein, includes a FEC encoder configured to encode FEC for an encoded signal; a transmitter configured to optically transmit the encoded signal; a receiving configured to optically receive a signal; and a FEC decode configured to decode FEC on the received signal; wherein the encoded signal and the received signal have one or more timing markers included therewith that are detected by the FEC encoder or the FEC decoder, and wherein, responsive to detecting the one or more timing markers, the FEC encoder and the FEC decoder are configured to cause a timing determination.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, precision time transfer systems and methods are described in optical networks such as with Optical Transport Network (OTN) or the like. The objective of the precision time transfer systems and methods is to mitigate and minimize delay uncertainty and jitter in timing transfer in optical networks. In an exemplary embodiment, the precision time transfer systems and methods include timing reference points at a last point in a transmitter, such as in a Forward Error Correction (FEC) encoder engine, and at a first point in a receiver, such as in a FEC decoder engine. Note, as described herein, the last point and the first point are from a perspective of digital processing of data, and by determining timing reference points based thereon, uncertainty is removed in the precision time transfer systems and methods.

Optical Network

Figure 1:
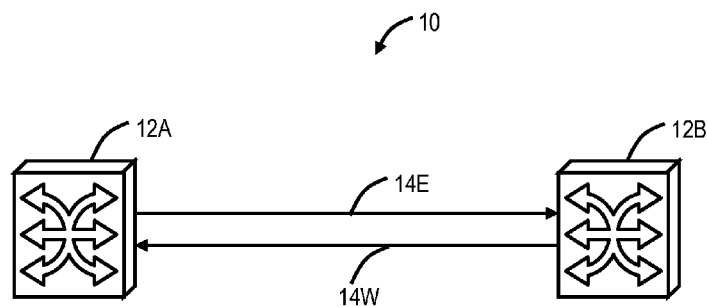
FIG. 1 is a network diagram of an optical network between two nodes.

Referring to FIG. 1, in an exemplary embodiment, a network diagram illustrates an optical network 10 between two nodes 12A, 12B. The nodes 12A, 12B are interconnected by links 14E, 14W providing bidirectional communication. The links 14E, 14W are optical fibers and the nodes 12A, 1B are optical network elements, such as shown, for example, in FIG. 5. The nodes 12A, 12B each have an associated clock tracking time, and an objective of the precision time transfer systems and methods is to convey the time of the node 12A to the node 12B such that the node 12B can synchronize its clock to the clock of the node 12A. In an exemplary embodiment, the optical network 10 can be a wavelength division multiplexing (WDM) network with one or more wavelengths of the links 14E, 14W, and includes OTN and other protocols such as Ethernet, etc. Note, the optical network 10 is presented for illustration purposes to describe the precision time transfer systems and methods. Practical embodiments contemplate additional nodes in various interconnection architectures. Further, the precision time transfer systems and methods, while illustrated between the two nodes 12A, 12B, can be implemented through any size network by selecting a first node, and propagating it's time to all of the other nodes with the precision time transfer systems and methods described herein.

Node Functionality in the Optical Network

Figure 2:
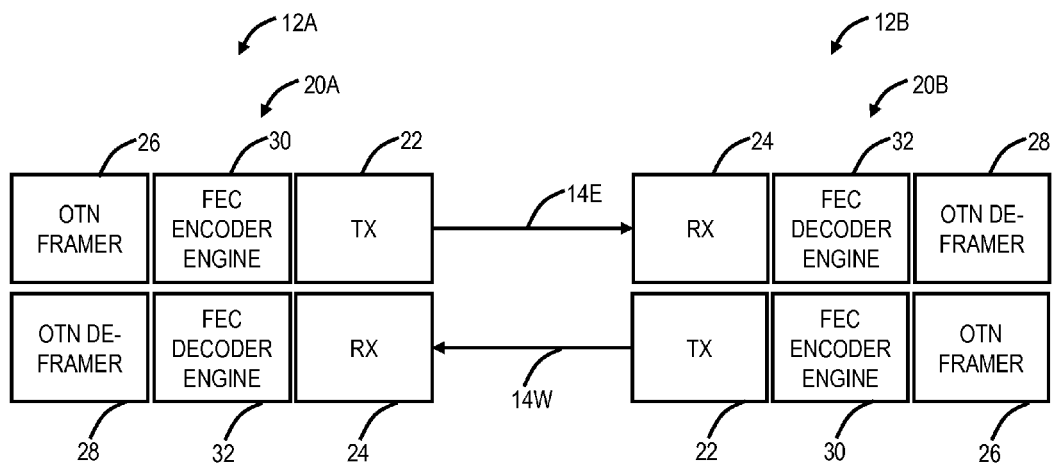
FIG. 2 is a block diagram illustrate of the optical network of FIG. 1 showing logical functionality at the nodes.

Referring to FIG. 2, in an exemplary embodiment, a block diagram illustrates the optical network 10 showing logical functionality at the nodes 12A, 12B. The nodes 12A, 12B each include an optical modem 20A, 20B with a transmitter and receiver to communicate over the links 14E, 14W. Specifically, the modems 20A, 20B each include a transmitter (TX) 22, a receiver (RX) 24, an OTN framer 26, an OTN de-framer 28, a FEC encoder engine 30, and a FEC decoder engine 32. Note, the modems 20A, 20B can include various additional functionality, which is omitted for illustration purposes. Also, the various functional components 22-32, while illustrated separately, can be realized in integrated hardware. The TX 22 of the modem 20A communicates with the RX 24 of the modem 20B, over the link 14E, and the TX 22 of the modem 20B communicates with the RX 24 of the modem 20A, over the link 14, thus forming the bidirectional communication.

Describing the signal flow from the modem 20A to the modem 20B, the OTN framer 26 is configured to frame an incoming signal with OTN overhead and perform overhead processing therein. The FEC encoder engine 30 is configured to receive an OTN signal from the OTN framer 26 and encode the OTN signal with Soft Decision (SD) FEC (SD-FEC). The transmitter 22 is configured to optically transmit a SD-FEC encoded, line adapted signal to the RX 24, which optically receives the SD-FEC encoded, line adapted signal and converts to an electrical received signal. The FEC decoder engine 32 receives the electrical received signal and performs SD-FEC decoding to provide an error corrected signal. The OTN de-framer 28 processes the OTN overhead from the error corrected signal. Note, the description herein is for a Single Vendor Intra-Domain Integration (SV-IaDI) Optical Transmission Section. There are various other functions that can be performed by the nodes 12A, 12B that are omitted for illustration purposes (such as Multi-Vendor Intra-Domain Integration (MV-IaDI)).

In an exemplary embodiment, the modems 20A, 20B are coherent optical modems with Digital Signal Processing (DSP) therein. The modems 20A, 20B can support programmable modulation, or constellations with both varying phase and/or amplitude. In an exemplary embodiment, the flexible optical modem can support multiple coherent modulation formats such as, for example, i) dual-channel, dual-polarization (DP) binary phase-shift keying (BPSK) for 100 G at submarine distances, ii) DP quadrature phase-shift keying (QPSK) for 100 G at ultra long haul distances, iii) 16-quadrature amplitude modulation (QAM) for 200 G at metro to regional (600 km) distances), or iv) dual-channel 16 QAM for 400 G at metro to regional distances. With associated digital signal processing (DSP) in the modem 20A, 20B hardware, moving from one modulation format to another is completely software-programmable.

In another exemplary embodiment, the modem 20A, 20B can support N-QAM modulation formats with and without dual-channel and dual-polarization where N can even be a real number and not necessarily an integer. Here, the modem 20A, 20B can support non-standard speeds since N can be a real number as opposed to an integer, i.e. not just 100 G, 200 G, or 400 G, but variable speeds, such as 130 G, 270 G, 560 G, etc. These rates could be integer multiples of 10 GB/s, or of 1 GB/s. Furthermore, with the DSP and software programming, the capacity of the flexible optical modem can be adjusted upwards or downwards in a hitless manner so as to not affect the guaranteed rate. In other exemplary embodiments, the modem 20A, 20B can include hardware which lacks the aforementioned functionality and thus supports a single modulation format/baud rate which cannot be adjusted (but other parameters can be adjusted like power, spectrum location, etc.). Additionally the modems 20A, 20B can tune and arbitrarily select spectrum; thus no optical filters are required. Additionally, the modem 20A, 20B can support various aspects of nonlinear effect mitigation and dispersion compensation (both for chromatic and polarization mode) in the electrical domain, thus eliminating external dispersion compensation devices, filters, etc. Modems can also adapt the forward error correction coding that is used, as another method to trade-off service rate vs noise tolerance. Note, based on this functionality, there are associated timing uncertainties added, and the precision time transfer systems and methods eliminate the timing uncertainties.

Modem Adaptation Process

Figure 3:
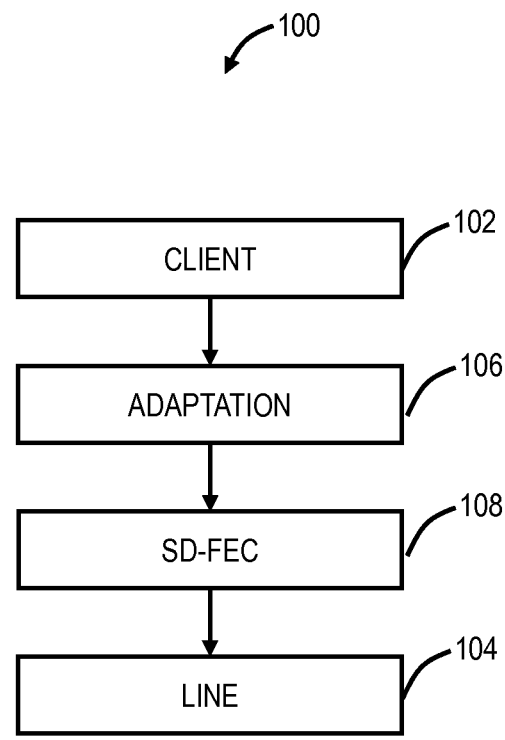
FIG. 3 is an atomic function diagram illustrates an adaptation process, which may be implemented in modems at the nodes of FIG. 2.

Referring to FIG. 3, in an exemplary embodiment, an atomic function diagram illustrates an adaptation process 100, which may be implemented in the modems 20A, 20B. The adaptation process 100 can be based on the ITU-T standard Optical channel Transport Unit k (k=0, 1, 2, 3, 4, flex) or C=100×n (n=1, 2, 3, . . . ) (OTUk/Cn) frame structures and tributary slots, and other variants or implementations are also contemplated. Of course, any type of signal is contemplated herein including OTN signals. Note, the adaptation of OTUk/Cn for Single Vendor Intra-Domain Integration (SV-IaDI) is not subject to standardization. That is, the adaptation process 100 is used for a vendor's line-side transmission. The adaptation process 100 is illustrated from the top, and includes a client 102, for adaptation to a line 104. The adaptation process 100 can take in an OTUk/Cn frame or the like, and format or wrap it appropriately for a proprietary line. After an adaptation 106 of the client 102, SD-FEC 108 can be added, and the line 104 can be provided to a modem.

Conventionally, time transfer techniques utilize measurements or markers in OTN overhead or via exchanging time stamped packets. This is problematic with the SV-IaDI adaptation processes or the like, with SD-FEC iterative implementations, and with any processes or implementations with non-deterministic delays, as these processes and implementations add variable delays based on the processing therein. With respect to the adaptation processes, there is potentially additional processing performed after the OTN framer 26 has performed OTN header processing. Thus, if a time reference is inserted by the OTN framer 26, in the OTN overhead, there may be additional delay in the adaptation processes that is not corrected in the time reference. With the advent of more complex circuitry, SD-FEC implementations are emerging to provide additional coding gain and performance, which is critical with high-speed implementations at 100 GB/s and beyond. However, with the SD-FEC implementations, the FEC encoder engine 30 and the FEC decoder engine 32 can also add a variable delay that is not corrected in the time reference, if it is in the OTN overhead. This is due to rate-adaptive FEC coding as well as iterative decoding associated with SD-FEC. As noted herein, hundreds of nanoseconds of time uncertainty can be added on each network hop to the time reference. Of course, this is additive in larger network implementations.

Precision Time Transfer Process

Figure 4:
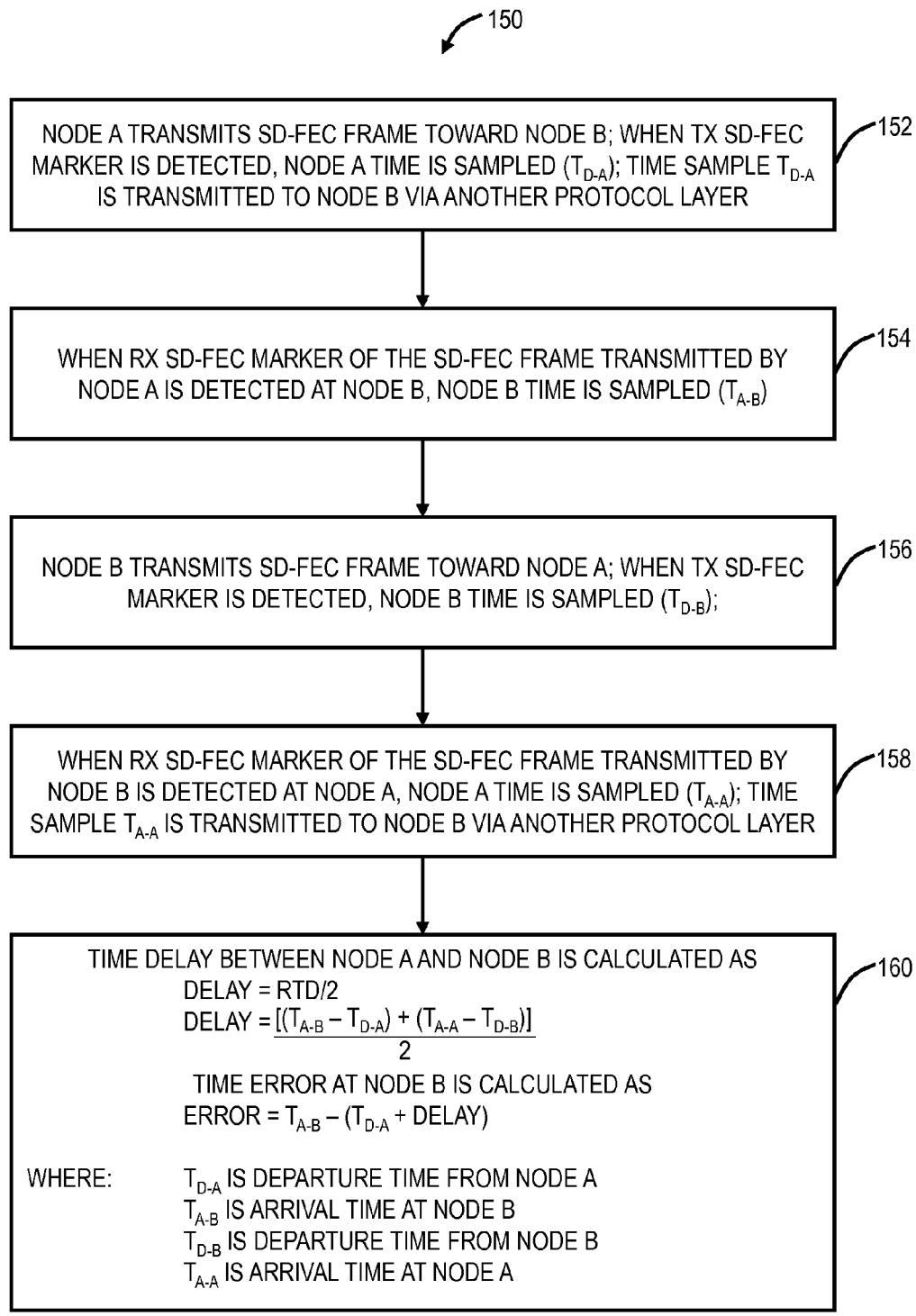
FIG. 4 is a flow chart of a precision time transfer process.

Referring to FIG. 4, in an exemplary embodiment, a flow chart illustrates a precision time transfer process 150. The precision time transfer process 150 contemplates operation through the nodes 12A, 12B, the modems 20A, 20B, and/or the adaptation process 100. In some exemplary embodiments, more or fewer steps could be included in the precision time transfer process 150. A key aspect of the precision time transfer process 150 is to convey timing references between the nodes 12A, 12B during any FEC encoding or decoding processes, such as in the FEC frame or logical layer. That is, the precision time transfer process 150 defines a time reference point at the SD-FEC adaptation layer (previously only defined for higher layer protocols such as the Ethernet layer, and currently being defined for the OTN layer) to minimize the effects of the FEC processing and/or SV-IaDI adaptation on precision of the transferred timing information. In this manner, the conveyed timing references are not impacted by any delays associated with the adaptation processes or the SD-FEC. By doing this, the precision time transfer systems and methods include timing reference points at a last point in the modem 20A, such as in the FEC encoder engine 30 or in the SD-FEC 126, and at a first point in the modem 20B, such as in the FEC decoder engine 32, and vice versa. Note, as described herein, the last point and the first point are from a perspective of digital processing of data. This eliminates any of the delays due to the SV-IaDI, and it has been shown that the accuracy improvements can be over an order of magnitude better than the hundreds of nanoseconds currently exhibited, such as below 10 ns of accuracy.

For illustration purposes, the precision time transfer process 150 is described with reference to the nodes 12A, 12B in the optical network 10. Here, the objective is to synchronize a clock for the node 12B with a clock of the node 12A. Also, with the appropriate time references captured, through the SD-FEC frame, and transferred to the nodes 12A, 12B, time transfer between the nodes 12A, 12B can be achieved using well known techniques in other protocols. That is, transferring the time references from the node 12A to the node 12B can be via a separate protocol layer, such as Ethernet packets, a Data Communication Network (DCN), an Optical Service Channel (OSC), OTN in-band messaging channel (OSMC), etc.

The precision time transfer process 150 involves using an SD-FEC marker (as seen in the last atomic function diagram in the adaptation process 100) as a reference for timestamp generation. There can be a TX SD-FEC marker, which is detected by the FEC encoder engine 30, and a RX SD-FEC marker, which is detected by the FEC decoder engine 32. The SD-FEC marker can include various techniques, such as, without limitation, a toggling signal, a fixed pattern (e.g., a pseudo-random binary sequence (PRBS)), an overhead bit, a delimiter in the SD-FEC frame, a line encoding signal, and the like, in the FEC frame or logical layer. The SD-FEC marker can be at given intervals in the SD-FEC frame, as data bits, identifiers, delimiters, etc., or encoded in the FEC layer, such as an out-of-band marker. The time of detection becomes the time reference point or "significant instant". Again, this reference point is post OTN-mapping and FEC processing in the TX direction and pre OTN-mapping and FEC processing in the RX direction to minimize the uncertainty and jitter introduced by the FEC processing and OTN mapping.

The precision time transfer process 150 includes the node 12A transmitting an SD-FEC frame towards the node 12B. When a TX SD-FEC marker is detected, the node 12A time is sampled ($T_{D-A}$) and this time sample $T_{D-A}$ is transferred to the node 12B via another protocol layer (step 152). When the RX SD-FEC marker of the SD-FEC frame transmitted by the node 12A is detected at the node 12B, the node 12B time is sampled ($T_{A-B}$) (step 154). The node 12B transmits an SD-FEC frame towards the node 12A, and when the TX SD-FEC marker is detected, the node 12B time is sampled ($T_{D-B}$) (step 156). When the RX SD-FEC marker of the frame transmitted by the node 12B is detected at the node 12A, the node 12A time is sampled ($T_{A-A}$). This time sample $T_{A-A}$ is transferred to the node 12B via another protocol layer (step 158).

At this point, all four time samples are available at the node 12B. The time delay between the node 12A and the node 12B can be calculated as, assuming the time delays between the nodes 12A, 12B are symmetric:

$$\text{Round\_Trip\_Delay} = [(T_{A-B} - T_{D-A}) + (T_{A\_A} - T_{D-B})]$$
$$\text{Delay} = \frac{\text{Round\_Trip\_Delay}}{2}.$$

where: $T_{D-A}$ is departure time from the node 12A, $T_{A-B}$ is arrival time at the node 12B, $T_{D-B}$ is departure time from the node 12, and $T_{A-A}$ is arrival time at the node 12A.

The time error at the node 12B can be calculated as:

$$\text{Error} = T_{A-B} - (T_{D-A} + \text{Delay})$$

The clock at the node 12B can be adjusted by the Error thereby synchronizing with the clock at the node 12A. Control algorithms can then be employed to minimize the time error.

In an exemplary embodiment, a precision time transfer method, in a first node that communicates with a second node, to determine a difference in time between the first node and the second node, includes receiving a departure time, $T_{D-A}$, from the second node, wherein the departure time, $T_{D-A}$, is determined by the second node based on detecting a timing marker in a Forward Error Correction (FEC) frame or logical layer; determining an arrival time, $T_{A-B}$, based on detecting the timing marker in the FEC frame; and determining a time difference as $T_{A-B} - T_{D-A}$; wherein the timing marker is detected at a last point in a transmitter of the second node and at a first point in a receiver of the first node, during FEC processing. The receiving can be performed at a protocol layer separate from the FEC frame. The precision time transfer method can further include transmitting a FEC frame to the second node and determining a departure time, $T_{D-B}$, responsive to detecting the timing marker in the FEC frame; and receiving an arrival time, $T_{A-A}$, from the second node, wherein the arrival time, $T_{A-A}$, is determined by the second node based on detecting the timing marker in the FEC frame. The precision time transfer method can further include transmitting determining a delay between the first node and the second node as:

$$\text{Round\_Trip\_Delay} = [(T_{A-B} - T_{D-A}) + (T_{A\_A} - T_{D-B})]$$
$$\text{Delay} = \frac{\text{Round\_Trip\_Delay}}{2}.$$

The FEC frame can utilize Soft Decision FEC. The last point can be in a FEC encoder engine in the transmitter and the first point can be in a FEC decoder engine in the receiver. The last point can be subsequent to FEC encoding and line adaptation and the first point can be prior to FEC decoding and line adaptation thereby eliminating timing uncertainty based thereon. The first node and the second node can communicate via coherent optical modems. The time difference can be accurate to within 10 ns. The timing marker can be present in the FEC frame at a given interval. The timing marker, in the FEC frame, can be one of a toggling signal, a fixed pattern, one or more overhead bits, a delimiter, and a line encoding signal.

Synchronizing the time between the nodes 12A, 12B generally requires three steps. If you consider the edges of a clock, the first step is to make the period between the edges the same on both the nodes 12A, 12B. This is the process of making the frequency of the clocks the same. This is known as syntonization (although often called "frequency synchronization"). The second step is to make the edges of the clocks occur at the same instant. This is the process of making the phase of the clocks the same. This is known as synchronization (or perhaps "phase synchronization). The idea of time is relative. Therefore, to synchronize time between the two clocks, they need to relate their respective times to the same reference or epoch (e.g. Coordinated Universal Time (UTC)). This could be called "time synchronization". The second and third steps are often achieved using the same methods. As described herein, timestamps are shared between the nodes 12A, 12B for the purpose of synchronizing their respective clocks. Because the node 12B adjusts it's time based on the timestamps it received from the node 12A, the time at the node 12B (in addition to the phase) will synchronize to the time at the node 12A. The systems and methods described herein can be used to synchronize phase, or time. The first step can be achieved in different ways. One way would be to use the same timestamps used to achieve phase synchronization to achieve frequency syntonization. Another common way is to have the node 12B recover the physical layer clock from the node 12A using a Clock and Data Recovery (CDR)/Phase Lock Loop (PLL).

Exemplary Network Element/Node

Figure 5:
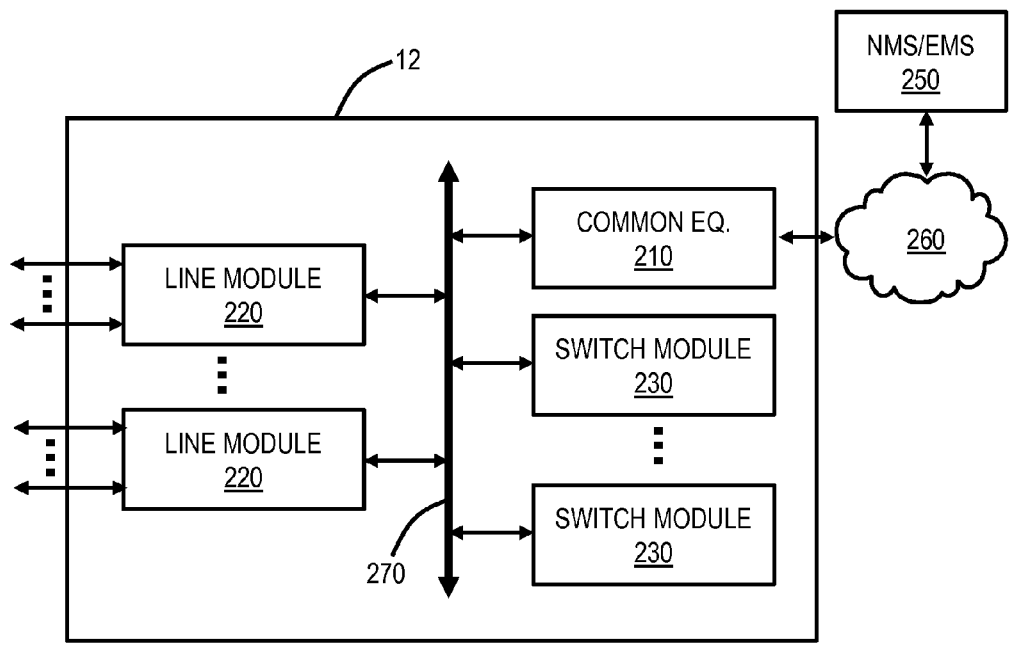
FIG. 5 is a block diagram of an exemplary node for use with the systems and methods described herein.

Referring to FIG. 5, in an exemplary embodiment, a block diagram illustrates an exemplary node 12 for use with the systems and methods described herein. In an exemplary embodiment, the exemplary node 12 can be a network element that may consolidate the functionality of a Multi-Service Provisioning Platform (MSPP), Digital Cross Connect (DCS), Ethernet and/or Optical Transport Network (OTN) switch, Dense Wave Division Multiplexed (DWDM)

platform, etc. into a single, high-capacity intelligent switching system providing Layer 0, 1, and/or 2 consolidation. In another exemplary embodiment, the node 12 can be any of an OTN Add/Drop Multiplexer (ADM), ROADM, a Multi-Service Provisioning Platform (MSPP), a Digital Cross-Connect (DCS), an optical cross-connect, an optical switch, a router, a switch, a Wavelength Division Multiplexing (WDM) terminal, an access/aggregation device, etc. That is, the node 12 can be any digital system with ingress and egress digital signals and switching therebetween of channels, timeslots, tributary units, etc. and/or photonic system with ingress and egress wavelengths and switching therebetween (ROADM). While the node 12 is generally shown as an optical network element, the systems and methods contemplated for use with any switching fabric, network element, or network based thereon.

In an exemplary embodiment, the node 12 includes common equipment 210, one or more line modules 220, and one or more switch modules 230. The common equipment 210 can include power; a control module; operations, administration, maintenance, and provisioning (OAM&P) access; user interface ports; and the like. The common equipment 210 can connect to a management system 250 through a data communication network 260 (as well as a Path Computation Element (PCE), Software Defined Network (SDN) controller, OpenFlow controller, etc.). The management system 250 can include a network management system (NMS), element management system (EMS), or the like. Additionally, the common equipment 210 can include a control plane processor, such as a controller 300 illustrated in FIG. 6, configured to operate the control plane as described herein. The node 12 can include an interface 270 for communicatively coupling the common equipment 210, the line modules 220, and the switch modules 230 therebetween. For example, the interface 270 can be a backplane, mid-plane, a bus, optical or electrical connectors, or the like. The line modules 220 are configured to provide ingress and egress to the switch modules 230 and to external connections on the links to/from the node 12. In an exemplary embodiment, the line modules 220 can form ingress and egress switches with the switch modules 230 as center stage switches for a three-stage switch, e.g. a three stage Clos switch. Other configurations and/or architectures are also contemplated. The line modules 220 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 220 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N×1.25 GB/s, and any rate in between or beyond. The line modules 220 can include wavelength division multiplexing interfaces, short reach interfaces, and the like, and can connect to other line modules 220 on remote network elements, end clients, edge routers, and the like, e.g. forming connections on the links 14E, 14W in the network 10. From a logical perspective, the line modules 220 provide ingress and egress ports to the node 12, and each line module 220 can include one or more physical ports. The switch modules 230 are configured to switch channels, wavelengths, timeslots, tributary units, packets, etc. between the line modules 220. For example, the switch modules 230 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 230 can include Time Division Multiplexed (TDM) (i.e., circuit switching) and/or packet switching engines. The switch modules 230 can include redundancy as well, such as 1:1, 1:N, etc. In an exemplary embodiment, the switch modules 230 can provide wavelength switching such as through a Wavelength Selective Switch (WSS) or the like.

Those of ordinary skill in the art will recognize the node 12 can include other components which are omitted for illustration purposes, and that the systems and methods described herein is contemplated for use with a plurality of different network elements with the node 12 presented as an exemplary type of a network element. For example, in another exemplary embodiment, the node 12 may not include the switch modules 230, but rather have the corresponding functionality in the line modules 220 (or some equivalent) in a distributed fashion. For the node 12, other architectures providing ingress, egress, and switching therebetween are also contemplated for the systems and methods described herein. In general, the systems and methods described herein contemplate use with any network element providing switching of channels, timeslots, tributary units, wavelengths, etc. and using the control plane. Furthermore, the node 12 is merely presented as one exemplary node 12 for the systems and methods described herein.

In an exemplary embodiment, the modems 20A, 20B can be one of the line modules 220, and an optical modem, configured to determine precise time information regardless of timing uncertainties due to Forward Error Correction (FEC) processing and adaptation therein, includes a FEC encoder configured to encode FEC for an encoded signal; a transmitter configured to optically transmit the encoded signal; a receiving configured to optically receive a signal; and a FEC decode configured to decode FEC on the received signal; wherein the encoded signal and the received signal have one or more timing markers included therewith that are detected by the FEC encoder or the FEC decoder, and wherein, responsive to detecting the one or more timing markers, the FEC encoder and the FEC decoder are configured to cause a timing determination.

Exemplary Controller

Figure 6:
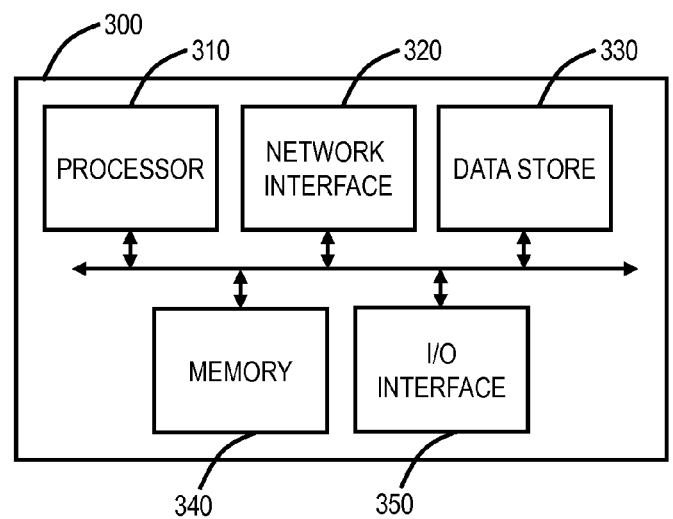
FIG. 6 is a block diagram illustrates a controller to provide control plane processing and/or operations, administration, maintenance, and provisioning (OAM&P) for the node of FIG. 5.

Referring to FIG. 6, in an exemplary embodiment, a block diagram illustrates a controller 300 to provide control plane processing and/or operations, administration, maintenance, and provisioning (OAM&P) for the node 12. The controller 300 can be part of common equipment, such as common equipment 210 in the node 12, or a stand-alone device communicatively coupled to the node 12 via the DCN 260. The controller 300 can include a processor 310 which is hardware device for executing software instructions such as operating the control plane. The processor 310 can be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 310 is configured to execute software stored within memory, to communicate data to and from the memory, and to generally control operations of the controller 300 pursuant to the software instructions. The controller 300 can also include a network interface 320, a data store 330, memory 340, an Input/output (I/O) interface 350, and the like, all of which are communicatively coupled therebetween and with the processor 310.

The network interface 320 can be used to enable the controller 300 to communicate on the DCN 260, such as to communicate control plane information to other controllers, to the management system 250, and the like. The network interface 320 can include, for example, an Ethernet card (e.g., 10BaseT, Fast Ethernet, Gigabit Ethernet) or a wireless local area network (WLAN) card (e.g., 802.11). The network interface 320 can include address, control, and/or data connections to enable appropriate communications on the network. The data store 330 can be used to store data, such as control plane information, provisioning data, OAM&P data, etc. The data store 330 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 330 can incorporate electronic, magnetic, optical, and/or other types of storage media. The memory 340 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 340 may incorporate electronic, magnetic, optical, and/or other types of storage media. Note that the memory 340 can have a distributed architecture, where various components are situated remotely from one another, but may be accessed by the processor 310. The I/O interface 350 includes components for the controller 300 to communicate to other devices. Further, the I/O interface 350 includes components for the controller 300 to communicate with the other nodes, such as using overhead associated with OTN signals.

In an exemplary embodiment, the controller 300 is configured to communicate with other controllers 300 in the network 10 to operate the control plane for control plane signaling. This communication may be either in-band or out-of-band. For SONET networks and similarly for SDH networks, the controllers 300 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 300 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. For example, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling. Note, the process 150 can utilize any of the above for communicating time information between the nodes 12A, 12B, i.e. as the another protocol layer.

In an exemplary embodiment, the controller 300 is configured to, receive a departure time, $T_{D-A}$, from the second node, wherein the departure time, $T_{D-A}$, is determined by the second node based on detecting a timing marker in a Forward Error Correction (FEC) frame or logical layer, determine an arrival time, $T_{A-B}$, based on detecting the timing marker in the FEC frame, and determine a time difference as $T_{A-B}-T_{D-A}$, wherein the timing marker is detected at a last point in a transmitter of the second node and at a first point in a receiver of a line port, during FEC processing. The controller 300 can be communicatively coupled to the second node via a protocol layer separate from the FEC frame, for to receive the departure time, $T_{D-A}$. The controller can be further configured to determine a departure time, $T_{D-B}$, responsive to detecting the timing marker in a FEC frame transmitted to the second node; and receive an arrival time, $T_{A-A}$, from the second node, wherein the arrival time, $T_{A-A}$, is determined by the second node based on detecting the timing marker in the FEC frame. Note, the controller 300 can include a clock for the node 12 or the clock could be located elsewhere in the node 12. With the systems and methods described herein, the controller 12 can be configured to modify the clock to synchronize times with other nodes, or to provide the time at the node 12 such that other nodes can synchronize.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A precision time transfer method, in a first node that communicates with a second node, to determine a difference in time between the first node and the second node, the precision time transfer method comprising:
receiving a departure time, $T_{D-A}$, from the second node, wherein the departure time, $T_{D-A}$, is determined by the second node based on detecting a timing marker included in a Forward Error Correction (FEC) frame or layer;
determining an arrival time, $T_{A-B}$, based on detecting the timing marker in the FEC frame or layer; and
determining a time difference based on the departure time and the arrival time;
wherein the timing marker is detected subsequent to FEC encoding in a transmitter of the second node and prior to FEC decoding in a receiver of the first node.

2. The precision time transfer method of claim 1, wherein the receiving is performed by a protocol layer separate from the FEC frame or layer.

3. The precision time transfer method of claim 1, further comprising:
transmitting a FEC frame to the second node and determining a departure time, $T_{D-B}$, responsive to detecting a timing marker in the FEC frame; and
receiving an arrival time, $T_{A-A}$, from the second node, wherein the arrival time, $T_{A-A}$, is determined by the second node based on detecting the timing marker in the FEC frame.

4. The precision time transfer method of claim 3, further comprising:
determining a delay between the first node and the second node as:

$$\text{Round\_Trip\_Delay} = [(T_{A-B} - T_{D-A}) + (T_{A\_A} - T_{D-B})]$$

$$\text{Delay} = \frac{\text{Round\_Trip\_Delay}}{2}.$$

5. The precision time transfer method of claim 1, wherein the FEC frame utilizes Soft Decision FEC.

6. The precision time transfer method of claim 1, wherein the FEC encoding is in a FEC encoder engine in the transmitter and the FEC decoding is in a FEC decoder engine in the receiver.

7. The precision time transfer method of claim 1, wherein the timing marker is detected subsequent to FEC encoding and line adaptation and the timing marker is detected prior to FEC decoding and line adaptation thereby eliminating timing uncertainty based thereon.

8. The precision time transfer method of claim 1, wherein the first node and the second node communicate via Optical Transport Network.

9. The precision time transfer method of claim 1, wherein the time difference is independent from an amount of time spent processing in the FEC layer.

10. The precision time transfer method of claim 1, wherein the timing marker is present in the FEC frame or layer at a given interval.

11. The precision time transfer method of claim 1, wherein the timing marker, in the FEC frame or layer, is one of a toggling signal, a fixed pattern, one or more overhead bits, a delimiter, and a line encoding signal.

12. A node that communicates with a second node, and the node is configured to determine a difference in time from the second node, the node comprising:
one or more line ports communicatively coupled to the second node; and
a controller communicatively coupled to the one or more line ports, wherein the controller is configured to
receive a departure time, $T_{D-A}$, from the second node, wherein the departure time, $T_{D-A}$, is determined by the second node based on detecting a timing marker included in a Forward Error Correction (FEC) frame,
determine an arrival time, $T_{A-B}$, based on detecting the timing marker in the FEC frame, and
determine a time difference based on the departure time and the arrival time,
wherein the timing marker is detected subsequent to FEC encoding in a transmitter of the second node and prior to FEC decoding in a receiver of a line port.

13. The node of claim 12, wherein the controller is communicatively coupled to the second node via a protocol layer separate from the FEC frame, to receive the departure time, $T_{D-A}$.

14. The node of claim 12, wherein the controller is further configured to:
determine a departure time, $T_{D-B}$, responsive to detecting the timing marker in a FEC frame transmitted to the second node; and
receive an arrival time, $T_{A-A}$, from the second node, wherein the arrival time, $T_{A-A}$, is determined by the second node based on detecting the timing marker in the FEC frame.

15. The node of claim 12, wherein the controller is further configured to:
determine a delay to the second node as:

$$\text{Round\_Trip\_Delay} = [(T_{A-B} - T_{D-A}) + (T_{A\_A} - T_{D-B})]$$

$$\text{Delay} = \frac{\text{Round\_Trip\_Delay}}{2}.$$

16. The node of claim 12, wherein the FEC encoding is in a FEC encoder engine in the transmitter and the FEC decoding is in a FEC decoder engine in the receiver.

17. The node of claim 12, wherein the timing marker is detected subsequent to FEC encoding and line adaptation and the timing marker is detected is prior to FEC decoding and line adaptation thereby eliminating timing uncertainty based thereon.

18. The node of claim 12, wherein the timing marker is present in the FEC frame or logical layer at a given interval.

19. The node of claim 12, wherein the timing marker, in the FEC frame, is one of a toggling signal, a fixed pattern, one or more overhead bits, a delimiter, and a line encoding signal.

20. An optical modem, configured to determine precise time information regardless of timing uncertainties due to Forward Error Correction (FEC) processing and adaptation therein, the optical modem comprising:
a FEC encoder configured to encode FEC;
a transmitter configured to optically transmit the FEC encoded signal;
a receiver configured to receive an optical signal; and a FEC decoder configured to decode FEC on the received optical signal;

wherein the encoded signal and the received optical signal have one or more timing markers included therewith in the FEC encoded signal that are detected by circuitry in the FEC encoder subsequent to FEC encoding or by circuitry in the FEC decoder prior to FEC decoding, and wherein, responsive to detecting the one or more timing markers, the FEC encoder and the FEC decoder are configured to cause a timing determination.

21. The optical modem of claim 20, wherein the timing marker is detected subsequent to FEC encoding and line adaptation and the timing marker is detected is prior to FEC decoding and line adaptation thereby eliminating timing uncertainty based thereon.

22. The optical modem of claim 20, wherein the timing determination is based on one of i) an arrival time from the FEC decoder and a departure time from a second FEC encoder associated with a second optical modem and ii) a departure time from the FEC encoder and an arrival time from a second FEC decoder associated with the second optical modem.

23. The optical modem of claim 20, wherein the one or more timing markers, in the FEC encoded signal, are one of a toggling signal, a fixed pattern, one or more overhead bits, a delimiter, and a line encoding signal.

* * * * *